(12) United States Patent
Pipard et al.

(10) Patent No.: US 11,655,516 B2
(45) Date of Patent: May 23, 2023

(54) TEMPERED AND COATED STEEL SHEET HAVING EXCELLENT FORMABILITY AND A METHOD OF MANUFACTURING THE SAME

(71) Applicant: ArcelorMittal, Luxembourg (LU)

(72) Inventors: Jean-Marc Pipard, Vaux (FR); Marc Olivier Thenot, Malancourt-la-Montagne (FR)

(73) Assignee: ArcelorMittal, Luxembourg (LU)

( * ) Notice: Subject to any disclaimer, the term of this patent is extended or adjusted under 35 U.S.C. 154(b) by 224 days.

(21) Appl. No.: 16/467,643

(22) PCT Filed: Dec. 15, 2017

(86) PCT No.: PCT/IB2017/057996
§ 371 (c)(1),
(2) Date: Jun. 7, 2019

(87) PCT Pub. No.: WO2018/116099
PCT Pub. Date: Jun. 28, 2018

(65) Prior Publication Data
US 2019/0338388 A1   Nov. 7, 2019

(30) Foreign Application Priority Data
Dec. 21, 2016   (WO) .................. PCT/IB2016/057907

(51) Int. Cl.
| | | |
|---|---|---|
| C21D 9/46 | (2006.01) | |
| C21D 1/20 | (2006.01) | |
| C21D 1/22 | (2006.01) | |
| C21D 8/02 | (2006.01) | |
| C22C 38/02 | (2006.01) | |
| C22C 38/04 | (2006.01) | |
| C22C 38/06 | (2006.01) | |
| C22C 38/22 | (2006.01) | |
| C22C 38/26 | (2006.01) | |
| C22C 38/28 | (2006.01) | |
| C22C 38/38 | (2006.01) | |
| C23C 2/06 | (2006.01) | |
| C23C 2/40 | (2006.01) | |
| B32B 15/01 | (2006.01) | |

(52) U.S. Cl.
CPC .............. *C21D 9/46* (2013.01); *B32B 15/012* (2013.01); *C21D 1/20* (2013.01); *C21D 1/22* (2013.01); *C21D 8/0263* (2013.01); *C22C 38/02* (2013.01); *C22C 38/04* (2013.01); *C22C 38/06* (2013.01); *C22C 38/22* (2013.01); *C22C 38/26* (2013.01); *C22C 38/28* (2013.01); *C22C 38/38* (2013.01); *C23C 2/06* (2013.01); *C23C 2/40* (2013.01); *B32B 2605/08* (2013.01); *C21D 2211/001* (2013.01); *C21D 2211/002* (2013.01); *C21D 2211/005* (2013.01); *C21D 2211/008* (2013.01); *C22C 2204/00* (2013.01)

(58) Field of Classification Search
CPC .......... C21D 9/46; C21D 1/20; B32B 15/012; C23C 2/40
See application file for complete search history.

(56) References Cited

U.S. PATENT DOCUMENTS

| | | | |
|---|---|---|---|
| 8,137,487 B2 * | 3/2012 | Nonaka | C22C 38/38 148/603 |
| 9,702,035 B2 | 7/2017 | Kawata et al. | |
| 2004/0074575 A1 | 4/2004 | Kashima et al. | |
| 2010/0104891 A1 | 4/2010 | Nakagaito et al. | |
| 2010/0307644 A1 | 12/2010 | Gil Otin et al. | |
| 2014/0162088 A1 | 6/2014 | Kawata et al. | |
| 2014/0170439 A1 | 6/2014 | Allain et al. | |
| 2014/0234658 A1 | 8/2014 | Nozaki et al. | |
| 2014/0234660 A1 | 8/2014 | Kawata et al. | |
| 2015/0000797 A1 | 1/2015 | Sebald et al. | |

(Continued)

FOREIGN PATENT DOCUMENTS

| | | |
|---|---|---|
| CN | 101641456 | 2/2010 |
| CN | 103620063 A | 3/2014 |

(Continued)

OTHER PUBLICATIONS

JP-2000109951-A, Furukimi Osamu; Tosaka Akio; Uchiyama Takao; Yamada Nobuo; Yasuhara Hideko, English Translation provided from EPO, 2000 (Year: 2000).*

(Continued)

*Primary Examiner* — Anthony J Zimmer
*Assistant Examiner* — Jacob J Gusewelle
(74) *Attorney, Agent, or Firm* — Davidson, Davidson & Kappel, LLC

(57) ABSTRACT

A tempered and coated steel sheet having a composition containing the following elements, expressed in percentage by weight:
  0.17%≤carbon≤0.25%,
  1.8%≤manganese≤2.3%,
  0.5%≤silicon≤2.0%,
  0.03%≤aluminum≤1.2%,
  sulphur≤0.03%,
  phosphorus≤0.03%,
the remainder composition being composed of iron and unavoidable impurities caused by processing, the microstructure of said steel sheet containing in area fraction, 4 to 20% residual austenite, 0 to 15% of ferrite, 40 to 85% tempered bainite and a minimum of 5% of tempered martensite, wherein the cumulated amounts of tempered martensite and residual austenite is between 10 and 30%. The composition may also contain one or more of the following elements: chromium≤0.4%, molybdenum≤0.3%, niobium≤0.04%, titanium≤0.1%. Manufacturing methods and use of tempered and coated steel sheet for making vehicle parts are also described.

19 Claims, No Drawings

(56) References Cited

U.S. PATENT DOCUMENTS

| | | |
|---|---|---|
| 2016/0160309 A1 | 6/2016 | Allain et al. |
| 2017/0029914 A1 | 2/2017 | Hayashi et al. |
| 2017/0268077 A1 | 9/2017 | Murakami et al. |
| 2017/0327919 A1 | 11/2017 | Kawasaki |
| 2017/0335423 A1 | 11/2017 | Murakami et al. |
| 2018/0237880 A1 | 8/2018 | Koshaka et al. |
| 2020/0095657 A1 | 3/2020 | Pipard et al. |

FOREIGN PATENT DOCUMENTS

| | | | |
|---|---|---|---|
| CN | 105793455 | | 7/2016 |
| EP | 3085802 A1 | | 10/2016 |
| EP | 3101147 A1 | | 12/2016 |
| JP | 2000109951 A | * | 4/2000 |
| JP | 2015147991 | | 8/2015 |
| JP | 2015175050 | | 10/2015 |
| JP | 2015175050 A | * | 10/2015 |
| JP | 2016098413 A | | 5/2016 |
| JP | 2016098427 A | | 5/2016 |
| RU | 2437945 | | 12/2011 |
| RU | 2574555 C2 | | 8/2014 |
| RU | 2557862 | | 7/2015 |
| RU | 2566121 C1 | | 10/2015 |
| RU | 2574568 C2 | | 2/2016 |
| WO | 2016001702 A1 | | 1/2016 |
| WO | 2016020714 A1 | | 2/2016 |
| WO | WO-2016020714 A1 * | 2/2016 | ........... B32B 15/012 |
| WO | WO2016067624 | | 5/2016 |
| WO | WO2016139876 | | 9/2016 |

OTHER PUBLICATIONS

JP-2015175050-A, Azuma Masashi; Kawada Hiroyuki; Maruyama Naoki; Uenishi Akihiro, English Translation obtained from EPO, 2015 (Year: 2015).*

The International Search Report issued in connection with International application No. PCT/IB2017/057996 dated Feb. 12, 2018.

The International Search Report issued in connection with International application No. PCT/IB2016/057907 dated Sep. 18, 2017.

* cited by examiner

TEMPERED AND COATED STEEL SHEET HAVING EXCELLENT FORMABILITY AND A METHOD OF MANUFACTURING THE SAME

FIELD OF THE INVENTION

The present invention relates to a tempered and coated steel sheet having excellent mechanical properties suitable for use in manufacturing of vehicles.

BACKGROUND

Intense research and development efforts are put in to reduce the amount of material utilized in car by increasing the strength of material. Conversely, an increase in strength of steel sheets decreases formability, and thus development of materials having both high strength and high formability is needed.

Therefore many high strength steels having excellent formability have been developed such as TRIP steels. Recently, strong endeavors to develop TRIP steels with properties such as high strength and high formability are put in place, as TRIP steel is a good compromise between mechanical strength and formability due to its complex structure including ferrite, which is a ductile component, harder components such as islands of martensite and austenite (MA), the majority of which consists of residual austenite, and finally the bainitic ferrite matrix, which has a mechanical strength and ductility which are intermediate between ferrite and the MA islands.

TRIP steels have a very high capacity for consolidation, which makes possible a good distribution of the deformations in the case of a collision or even during the forming of the automobile part. It is therefore possible to produce parts which are as complex as those made of conventional steels but with improved mechanical properties, which in turn makes it possible to reduce the thickness of the parts to comply with identical functional specifications in terms of mechanical performance. These steels are therefore an effective answer to the requirements of reduced weight and increased safety in vehicles. In the field of hot-rolled or cold-rolled steel sheet, this type of steel has applications for, among other things, structural and safety parts for automotive vehicles.

These properties are associated with the structure of such steels, which consists of a matrix phase which may comprise ferrite, bainite or martensite alone or in combination with each other, while other microstructural constituents such as residual austenite may be present. The residual austenite is stabilized by an addition of silicon or aluminum, these elements retarding the precipitation of carbides. The presence of residual austenite gives high ductility to the steel sheet before it is shaped into a part. Under the effect of a subsequent deformation, for example when stressed uniaxially, the residual austenite of a sheet made of TRIP steel is progressively transformed to martensite, resulting in substantial hardening and delaying the appearance of necking.

To achieve a tensile strength greater than 800 to 1000 MPa, multiphase steels having a predominantly bainitic structure have been developed. In the automotive industry or in industry in general, such steels are advantageously used for structural parts such as bumper cross-members, pillars, various reinforcements and abrasion-resistant wear parts. However, the formability of these parts requires, simultaneously, a sufficient level of total elongation, greater than 10%.

All these steel sheets present relatively good balances of resistance and ductility, but an improvement in yield strength and hole expansion performance over steels currently in production is needed, in particular for coated steel sheets.

SUMMARY OF THE INVENTION

An object of various embodiments of the present invention is to solve these problems by providing steel sheets that simultaneously have:
an ultimate tensile strength greater than or equal to 950 MPa and preferably above 1050 MPa, or even above 1100 MPa,
a yield strength of at least 700 Mpa,
a total elongation greater than or equal to 12%, and
a hole expansion ratio greater than or equal to 18%

An additional object of various embodiments of the present invention is to provide steel sheets that also have good suitability for forming, in particular for rolling, and a good weldability.

Another object of the present invention is to provide a method for the manufacturing of these sheets that is compatible with conventional industrial applications while being robust towards manufacturing parameters shifts.

The present invention provides a tempered and coated steel sheet having a composition comprising the following elements, expressed in percentage by weight:
$0.17\% \leq \text{carbon} \leq 0.25\%$,
$1.8\% \leq \text{manganese} \leq 2.3\%$,
$0.5\% \leq \text{silicon} \leq 2.0\%$,
$0.03\% \leq \text{aluminum} \leq 1.2\%$,
$\text{sulphur} \leq 0.03\%$,
$\text{phosphorus} \leq 0.03\%$,
the remainder of the composition composed of iron and unavoidable impurities caused by processing,
the microstructure of said steel sheet comprising in area fraction, 4 to 20% residual austenite, 0 to 15% of ferrite, 40 to 85% tempered bainite and a minimum of 5% of tempered martensite, wherein the cumulated amounts of tempered martensite and residual austenite is between 10 and 30%. In some embodiments, the composition further comprises one or more of the following elements:
$\text{chromium} \leq 0.4\%$,
$\text{molybdenum} \leq 0.3\%$,
$\text{niobium} \leq 0.04\%$,
$\text{titanium} \leq 0.1\%$.

In some embodiments, the composition includes 0.03% to 0.6% of aluminium. In some embodiments, the cumulated amounts of tempered martensite and residual austenite is between 10% and 25%. In some embodiments, the cumulated amounts of tempered martensite and residual austenite is more than or equal to 15% and the percentage of tempered martensite is higher than 10%. In some embodiments, the carbon content of residual austenite is between 0.9 to 1.1%. In some embodiments, the tempered and coated steel sheet has a yield strength above 700 MPa, a ultimate tensile strength above 950 MPa, a hole elongation ratio above 18% and a total elongation above 12%. In some embodiments, the tempered and coated steel sheet has a ultimate tensile strength of 1000 MPa to 1100 MPa and a hole expansion ratio above 20%.

The present invention also provides a method of production of a tempered and coated steel sheet comprising the following successive steps:

providing a semi-finished product comprising a steel composition comprising the following elements, expressed in percentage by weight:

0.17%≤carbon≤0.25%,
1.8%≤manganese≤2.3%,
0.5%≤silicon≤2.0%,
0.03%≤aluminum≤1.2%,
sulphur≤0.03%,
phosphorus≤0.03%, the remainder of the composition composed of iron and unavoidable impurities caused by processing;

reheating said semi-finished product to a temperature above Ac3;

hot rolling the said semi-finished product in the austenitic range, wherein the hot rolling finishing temperature is between 750° C. and 1050° C. to obtain a hot rolled steel sheet;

cooling the hot rolled steel sheet at a cooling rate 20 to 150° C./s to a coiling temperature of less than or equal to 600° C.; and coiling said hot rolled steel sheet;

cooling said hot rolled steel sheet to room temperature;

annealing said hot rolled steel sheet at temperature between 400° C. and 750;

cold rolling the hot rolled annealed steel sheet with a reduction rate between 30 and 80% to obtain a cold rolled steel sheet;

then heating said cold rolled steel sheet at a rate between 1 to 20° C./s to a soaking temperature above Ae3 where it is held during less than 600 seconds;

then cooling said cold rolled steel sheet at a rate greater than 5° C./s to a temperature above Ms and less than 475° C. and holding the cold rolled steel sheet at such temperature during 20 to 400 seconds;

then cooling said cold rolled steel sheet at cooling rate not greater than 200° C./s down to room temperature;

then reheating the annealed steel sheet at a rate between 1° C./s to 20° C./s to a soaking temperature between 440° C. and 600° C. where it is held during less than 100s and then hot dipping the annealed steel sheet in a bath zinc or zinc alloy coating for tempering and coating it, cooling the tempered and coated steel sheet to room temperature at a cooling rate between 1° C./s and 20° C./s. In some embodiments, the coiling temperature is above 400° C. In some embodiments, the method further comprises performing scale removal process on said hot rolled steel sheet and/or performing scale removal process on the hot rolled annealed steel sheet. In some embodiments, the composition includes 0.6% to 1.8% of silicon.

The present invention also provides parts or vehicles comprising a tempered and coated steel sheet according to various embodiments of the present invention.

Other characteristics and advantages of the invention will become apparent from the following detailed description of the invention.

DETAILED DESCRIPTION

Carbon is present in the steel according to the invention in content of 0.17% to 0.25%. Carbon is a gamma-former element and it promotes the stabilization of austenite. Moreover, it can be involved in the formation of precipitates that harden ferrite. Preferably, carbon content is at least of 0.18% to achieve TRIP effect by retained austenite and at most 0.25% to avoid impairing weldability. The carbon content is advantageously between 0.18 and 0.23% inclusive to optimize both high strength and elongation properties.

Manganese is present in the steel according to the invention at a content of 1.8% to 2.3%. Manganese is an element that provides hardening by substitutional solid solution in ferrite. A minimum content of 1.8% by weight is necessary to obtain the desired tensile strength. Nevertheless, above 2.3% manganese retards the formation of bainite and further enhances the formation of austenite with lower percentage of carbon, which at a later stage transforms into martensite, which is detrimental for the mechanical properties of the steel.

Silicon is present in the steel according to the invention at a content of 0.5% to 2.0%. Silicon plays an important role in the formation of the microstructure by slowing down the precipitation of carbides, which allows concentrating the carbon in the residual austenite for its stabilization. Silicon plays an effective role combined with that of aluminum, the best results from which, with regard to the specified properties, are obtained in content levels above 0.5%. The silicon content must be limited to 2.0% by weight to improve hot-dip coatability. The silicon content will preferably be from 0.6 to 1.8% as above 1.8%, silicon in combination with manganese may form brittle martensite instead of bainite. A content less than or equal to 1.8% simultaneously provides very good suitability for welding as well as good coatability.

Aluminum is present in the steel according to the invention at a content of 0.03% to 1.2% and preferably of 0.03% to 0.6%. Aluminum plays an important role in the invention by greatly slowing down the precipitation of carbides; its effect is combined with that of silicon, to sufficiently retard the precipitation of carbides and to stabilize the residual austenite. This effect is obtained when the aluminum content is greater than 0.03% and when it is less than 1.2%. The aluminum content will preferably be less than or equal to 0.6%. It is also generally thought that high levels of aluminum increase the erosion of refractory materials and the risk of plugging of the nozzles during casting of the steel upstream of the rolling. In excessive quantities, aluminum reduces hot ductility and increases the risk of the appearance of defects during continuous casting. Without careful control of the casting conditions, micro and macro segregation defects ultimately result in a central segregation in the annealed steel sheet. This central band will be harder than its surrounding matrix and will adversely affect the formability of the material.

Sulphur is also a residual element, the content of which should be kept as low as possible. Hence the content of sulphur is limited to 0.03% in the present invention. Sulphur content of 0.03% or above reduces the ductility on account of the excessive presence of sulfides such as MnS (manganese sulfides), which reduce the workability of the steel, and is also a source for the initiation of cracks.

Phosphorus may be present in a content up to 0.03%. Phosphorus is an element that hardens in solid solution but significantly reduces suitability for spot welding and hot ductility, in particular on account of its tendency toward grain boundary segregation or its tendency to co-segregate with manganese. For these reasons, its content must be limited to 0.03% to obtain good suitability for spot welding and good hot ductility. It is also a residual element, the content of which should be limited.

Chromium can be optionally present in the steel according to the invention at a content of up to 0.4% and preferably between 0.05% and 0.4%. Chromium, as manganese, increases hardenability in promoting the martensite formation. This element when it is present at a content above 0.05% is useful to reach the minimum tensile strength. When it is above 0.4%, the bainite formation is so delayed that the austenite is not sufficiently enriched in carbon. Indeed this austenite would be more or less totally transformed into martensite during the cooling to room temperature, and the total elongation would be too low.

Molybdenum is an optional element and can be added up to 0.3% to the steel according to the invention. Molybdenum plays an effective role in setting hardenability and hardness, delays the appearance of bainite and avoids carbides precipitation in bainite. However, the addition of molybdenum excessively increases the cost of the addition of alloy elements, so that, for economic reasons, its content is limited 0.3%.

Niobium could be added to the steel in a content up to 0.04%. It is an element suitable for forming carbo-nitrides to impart strength to the steel according to the invention by precipitation hardening. Because niobium delays the recrystallization during the heating, the microstructure formed at the end of the annealing is finer, leading to the hardening of the product. But, when the niobium content is above 0.04% the amount of carbo-nitrides is to large which could reduce the ductility of the steel.

Titanium is an optional element which may be added to the steel of present invention in a content up to 0.1% and preferably between 0.005% and 0.1%. As niobium, it is involved in carbo-nitrides so plays a role in hardening. But it is also involved to form TiN appearing during solidification of the cast product. The amount of Ti is so limited to 0.1% to avoid coarse TiN detrimental for hole expansion. In case the titanium content is below 0.005% it does not impart any effect on the steel of present invention.

The steel according to the invention comprises a microstructure comprising in area fraction, 4 to 20% residual austenite, 0 to 15% of ferrite, 40 to 85% bainite and a minimum of 5% of tempered martensite, wherein the cumulated amounts of tempered martensite and residual austenite is between 10 and 30%.

Ferrite constituent impart the steel according to the invention with enhanced elongation. To ensure reaching an elongation and hole expansion ratio at the required level, ferrite may be present up to a maximum level of 15% by area fraction so as to have 950 MPa of tensile strength or more, with at least 12% of total elongation and a hole expansion ratio of 18% or more. Ferrite is formed during the annealing process step at heating and holding stages or during the cooling after annealing. Such ferrite can be hardened by introduction of one or more elements in solid solution. Silicon and/or manganese are usually added to such steels or by introducing precipitate forming elements such as titanium, niobium and vanadium. Such hardening usually occurs during annealing of cold rolled steel sheet and is therefore effective before the tempering step but does not impair processability.

Tempered martensite is present at a minimum level of 5% by area fraction and preferably of 10%, in the steel according to the invention. Martensite is formed during cooling after the soaking from the unstable austenite formed during annealing and also during the final cooling after bainite transformation holding process. Such martensite gets tempered during the final tempering step. One of the effects of such tempering is to lower the carbon content of the martensite, which is therefore less hard and less brittle. The tempered martensite is composed of fine laths elongated in one direction inside each grain issued from a primary austenite grain, in which fine iron carbides sticks which are 50 to 200 nm long are precipitated between the laths following the <111> direction. This tempering of the martensite allows also increasing the yield strength thanks to the diminution of the hardness gap between martensite and ferrite or bainite phases.

Tempered bainite is present in the steel according to the invention and imparts strength to such steel. Tempered bainite is be present in the steel between 40 and 85% by area fraction. Bainite is formed during the holding at bainite transformation temperature after annealing. Such bainite may include granular bainite, upper bainite and lower Bainite. This bainite get tempered during the final tempering step to produce tempered bainite.

Residual austenite is an essential constituent for ensuring the TRIP effect and for bringing ductility. It can be contained alone or as islands of martensite and austenite (MA islands). The residual austenite of the present invention is present in an amount of 4 to 20% in area fraction and preferably has a carbon percentage of 0.9 to 1.1%. Carbon rich residual austenite contributes to the formation of bainite and also retards the formation of carbide in bainite. Hence its content must be preferred high enough so that the steel of the invention is enough ductile with total elongation preferably above 12% and its content should not be excessive of 20% because it would generate a decrease of the value of the mechanical properties.

Residual austenite is measured by a magnetic method called sigmametry, which consists of the magnetic moment measurement of the steel before and after a thermal treatment which destabilizes the austenite which is paramagnetic on the contrary of the other phases which are ferromagnetic.

In addition to the individual proportion of each element of the microstructure, the cumulated amounts of tempered martensite and residual austenite have to be between 10 to 30% in area fraction, preferably between 10 and 25% and more equal or above 15%, in particular when the tempered martensite amount is above 10%. This ensures that the targeted properties will be reached.

The steel sheet according to the invention can be produced by any appropriate manufacturing method and the man skilled in the art can define one. It is however preferred to use the method according to the invention, which comprises the following successive steps:

providing a semi-finished product comprising a steel composition according to the invention;

reheating said semi-finished product to a temperature above Ac3;

rolling the said semi-finished product in the austenitic range wherein the hot rolling finishing temperature shall be between 750° C. and 1050° C. to obtain a hot rolled steel sheet;

cooling the sheet at a cooling rate 20 to 150° C./s to a coiling temperature which is less than or equal to 600° C.; and coiling the said hot rolled sheet;

cooling the said hot rolled sheet to room temperature;

optionally performing perform scale removal process on said hot rolled steel sheet;

annealing is performed on hot rolled steel sheet at temperature between 400° C. and 750;

optionally performing scale removal process on said hot rolled annealed steel sheet;

cold rolling the said hot rolled annealed steel sheet with a reduction rate between 30 and 80% to obtain a cold rolled steel sheet;

then heating the said cold rolled steel sheet at a rate between 1 to 20° C./s to a soaking temperature above Ae3 where it is held during less than 600 seconds;

then cooling the sheet at a rate greater than 5° C./s to a temperature above Ms and below 475° C. where it is held during 20 to 400 s;

then cooling the steel sheet at cooling rate not greater than 200° C./s down to room temperature;

then reheating the annealed steel sheet at a rate between 1° C./s to 20° C./s to a soaking temperature between 440° C. and 600° C. where it is held during less than 100s and then hot dipping the steel sheet in a bath zinc or zinc alloy coating for tempering and coating it, cooling the tempered and coated steel sheet to room temperature at a cooling rate between 1° C./s and 20° C./s.

In particular, the present inventors have found out that performing a final tempering step before and during hot dip coating of the steel sheets according to the invention will increase the formability without having significant impact on other property of the said steel sheets. Such tempering step diminishes the hardness gap between soft phase such as ferrite and hard phases such as martensite and bainite. This reduction in hardness gap improves the hole expansion and formability properties. Moreover, a further reduction of this hardness gap is obtained by increasing the hardness of ferrite though addition of silicon and manganese and/or by precipitation of carbides during annealing. Through controlled hardening of soft phases and softening of hard phases, a significant increase in formability is achieved, while not diminishing the strength of such steel.

The process according to the invention includes providing a semi-finished casting of steel with a chemical composition within the range of the invention as described above. The casting can be done either into ingots or continuously in form of slabs or strips, i.e. with a thickness ranging from approximately 220 mm for slabs up to several tens of millimeters for strips. For example, a slab having the above-described chemical composition is manufactured by continuous casting, and is provided for hot rolling. Here, the slab can be rolled directly in line with the continuous casting or may be first cooled to room temperature and then reheated above Ac3.

The temperature of the slab which is subjected to hot rolling is generally above 1000° C. and must be below 1300° C. The temperatures mentioned herein are defined to ensure that all points of the slab reach the austenitic range. In case the temperature of the slab is lower than 1000° C., excessive load is imposed on a rolling mill. Further the temperature must not be above 1300° C. to avoid a risk of adverse growth of austenitic grain resulting in coarse ferrite grain which decreases the capacity of these grains to re-crystallize during hot rolling. Moreover, temperatures above 1300° C. enhance the risk of formation of thick layer oxides which are detrimental during hot rolling. The finishing rolling temperature must be between 750° C. and 1050° C. to ensure that the hot rolling takes place completely in the austenitic range.

The hot rolled steel sheet obtained in this manner is then cooled at a rate between 20 and 150° C./s down to a temperature below 600° C. The sheet is then coiled at a coiling temperature below 600° C., because above that temperature, there is a risk inter-granular oxidation. The preferred coiling temperature for the hot rolled steel sheet of the present invention is between 400 and 500° C. Subsequently, the hot rolled steel sheet is allowed to cool to room temperature.

If needed, the hot rolled steel sheet according to the invention undergoes a step of scale removal through any suitable processes such as pickling, removal by brushes or scrubbing on the hot-rolled steel sheet.

After removal of the scale is done, the steel sheet undergoes a step of annealing at a temperature between 400 and 750° C. to ensure hardness homogeneity in the coil. This annealing can, for example, last 12 minutes to 150 hours. The annealed hot rolled sheet may undergo an optional scale removal process to remove scale after such annealing, if needed. Afterwards, the annealed hot rolled sheet is cold rolled with a thickness reduction between 30 to 80%.

The cold rolled sheet undergoes then an annealing step where it is heated at a heating rate between 1 and 20° C./s, which is preferably greater than 2° C./s, up to a soaking temperature above Ae3, in the fully austenitic domain, where it is held during more than 10 seconds to ensure the quasi equilibrium for austenite transformation and less than 600 seconds.

The sheet is then cooled at a rate higher than 5° C./s, preferably higher than 30° C./s, down to a temperature above Ms and below 475° C. at which it is held during 20 to 400s, preferably during 30 to 380 seconds. This holding between Ms and 475° C. is performed to form bainite, to temper martensite if formed earlier and to facilitate austenite enrichment in carbon. Holding the cold rolled steel sheet for less than 20 seconds would lead to a too low quantity of bainite and not enough enrichment of austenite leading to a quantity of residual austenite lower than 4%. On the other hand, holding the cold rolled sheet during more than 400s would lead to the precipitation of carbides in bainite, thereby decreasing the carbon content in the austenite and reducing its stability.

The sheet is then cooled at a cooling rate not greater than 200° C./s down to room temperature. During this cooling, unstable residual austenite transforms to fresh martensite in form of MA islands, imparting the steel of the present invention with targeted tensile strength level.

The annealed cold rolled steel sheet is then heated at a heating rate between 1° C. and 20° C./s, preferably greater than 2° C./s, up to a soaking temperature between 440 and 600° C., preferably between 440 and 550° C., during less than 100s to homogenize and stabilize the temperature of the strip and also to simultaneously initiate tempering of the microstructure.

Then, the annealed cold rolled steel sheet is coated with zinc or zinc alloy by passing into a liquid Zn bath while the tempering process is in progress. The temperature of the Zn bath is usually between 440 and 475° C. Thereafter the coated and tempered steel sheet is obtained. This tempering process ensures the tempering of bainite and martensite phases and is also used to set the final residual austenite and martensite contents, through diffusion of carbon.

Thereafter, the coated and tempered steel sheet is allowed to cool down to room temperature at a cooling rate between 1 and 20° C./s and preferably between 5 and 15° C./s.

EXAMPLES

The following tests and examples presented herein are non-restricting in nature and must be considered for purposes of illustration only, and will display the advantageous features of the present invention and expound the significance of the parameters chosen by inventors after extensive experiments and further establish the properties that can be achieved by the steel according to the invention.

Samples of the steel sheets according to the invention and to some comparative grades were prepared with the compositions gathered in table 1 and the processing parameters gathered in table 2 and 3. The corresponding microstructures of those steel sheets were gathered in table 4 and the properties in table 5.

TABLE 1 compositions of the trials

| Steels | C | Mn | Si | Al | S | P | N | Cr | Nb | Ti |
|---|---|---|---|---|---|---|---|---|---|---|
| 1 | 0.218 | 2.08 | 1.491 | 0.038 | 0.003 | 0.014 | 0.0052 | 0.350 | 0.002 | 0.0041 |
| 2 | 0.211 | 2.11 | 1.488 | 0.042 | 0.003 | 0.012 | 0.0065 | 0.357 | 0.001 | 0.0038 |
| 3 | 0.200 | 2.20 | 1.501 | 0.040 | 0.006 | 0.012 | 0.0050 | 0.200 | — | — |
| 4 | 0.213 | 2.14 | 1.490 | 0.040 | 0.003 | 0.010 | 0.0030 | 0.350 | — | — |
| 5 | 0.210 | 2.10 | 0.750 | 0.750 | 0.005 | 0.012 | 0.0048 | 0.1 | 0.02 | — |

Tables 2 and 3: Process Parameters of the Trials

Before performing the annealing treatment, all the steels of invention as well as reference were reheated to a temperature between 1000° C. and 1280° C. and then subjected to hot rolling with a finishing rolling temperature above 850° C. and thereafter were coiled at a temperature below 580° C. The hot rolled coils were then processed as claimed and there after cold rolled with a thickness reduction between 30 to 80%. These cold rolled steel sheets were then submitted to the annealing and tempering steps as shown below:

| Steels | Ae1 (° C.) | Ae3 (° C.) | Bs (° C.) | Ms (° C.) | Annealing Holding T (° C.) | Annealing Holding t (s) | Annealing Cooling rate (° C.) | Holding Holding T (° C.) | Holding Holding t (s) |
|---|---|---|---|---|---|---|---|---|---|
| 1 | 730 | 865 | 534 | 364 | 870 | 155 | 30 | 405 | 370 |
| 2 | 730 | 865 | 533 | 366 | 870 | 155 | 30 | 405 | 370 |
| 3 | 730 | 865 | 538 | 370 | 870 | 155 | 30 | 405 | 370 |
| 4 | 730 | 865 | 530 | 365 | 870 | 155 | 46 | 405 | 370 |
| 5 | 726 | 937 | 568 | 379 | 850 | 100 | 30 | 430 | 200 |

TABLE 3 tempering process parameters of the trials

| Trials | Steel | Tempering Holding T (° C.) | Tempering Holding t (s) | Tempering Cooling rate (° C./s) | Coating Bath T (° C.) | Coating t (s) |
|---|---|---|---|---|---|---|
| Invention 1 | 1 | 540 | 23 | 1.8 | 460 | 13 |
| Invention 2 | 1 | 480 | 23 | 1.8 | 460 | 13 |
| Invention 3 | 1 | 460 | 23 | 1.8 | 460 | 13 |
| Invention 4 | 3 | 550 | 30 | 1.3 | 460 | 23 |
| Invention 5 | 3 | 550 | 16 | 2.4 | 460 | 12 |
| Invention 6 | 4 | 550 | 30 | 1.3 | 460 | 23 |
| Invention 7 | 4 | 550 | 16 | 2.4 | 460 | 12 |
| Invention 8 | 2 | 540 | 30 | 1.3 | 460 | 23 |
| Comparative 1 | 2 | 640 | 30 | 1.3 | 460 | 23 |
| Comparative 2 | 1 | 750 | 23 | 1.8 | 460 | 13 |
| Comparative 3 | 5 | 550 | 16 | 2.4 | 460 | 12 |
| Comparative 4 | 5 | 550 | 30 | 1.3 | 460 | 23 |
| Comparative 5 | 5 | 580 | 30 | 1.3 | 460 | 23 |

TABLE 4 microstructures of the samples
The final microstructure of all samples was determined using tests conducted in accordance with usual standards on different microscopes such as Scanning Electron Microscope. The results are gathered below:

| Trials | Ferrite | Tempered Bainite | Tempered Martensite | Residual Austenite |
|---|---|---|---|---|
| Invention 1 | 4 | 75.5 | 12 | 8.5 |
| Invention 2 | 3 | 75.3 | 12 | 9.7 |
| Invention 3 | 3 | 75.8 | 12 | 9.2 |
| Invention 4 | 8 | 77.0 | 11 | 4.0 |
| Invention 5 | 3 | 76.5 | 11 | 9.5 |
| Invention 6 | 7.5 | 76.0 | 12 | 4.5 |
| Invention 7 | 3 | 76.0 | 12 | 9.0 |
| Invention 8 | 7 | 75.5 | 12 | 5.5 |
| Comparative 1 | 12 | 75.7 | 12 | 0.3 |
| Comparative 2 | 11 | 76.9 | 12 | 0.1 |
| Comparative 3 | 39 | 42 | 11 | 8.0 |
| Comparative 4 | 43 | 42 | 11 | 4.0 |
| Comparative 5 | 44 | 41 | 11 | 3.0 |

The final microstructure of all samples was determined using tests conducted in accordance with usual standards on different microscopes such as Scanning Electron Microscope. The results are gathered below:

TABLE 5 mechanical properties of the samples

| Trials | YS (MPa) | UTS (MPa) | Tel (%) | HER (%) |
|---|---|---|---|---|
| Invention 1 | 968 | 1200 | 14.3 | 25 |
| Invention 2 | 1021 | 1232 | 14.2 | 29 |
| Invention 3 | 1027 | 1218 | 13.8 | 26 |
| Invention 4 | 815 | 1052 | 14.6 | 48 |

TABLE 5-continued mechanical properties of the samples

| Trials | YS (MPa) | UTS (MPa) | Tel (%) | HER (%) |
|---|---|---|---|---|
| Invention 5 | 803 | 1091 | 13.6 | 41 |
| Invention 6 | 849 | 1080 | 13.7 | 30 |
| Invention 7 | 854 | 1147 | 13.4 | 31 |
| Invention 8 | 915 | 1131 | 12.4 | 35 |
| Comparative 1 | 755 | 919 | 15.4 | 34 |
| Comparative 2 | 725 | 925 | 16.5 | 24 |
| Comparative 3 | 595 | 1006 | 17.7 | 20 |
| Comparative 4 | 603 | 935 | 18.5 | 23 |
| Comparative 5 | 614 | 912 | 19.7 | 26 |

The following mechanical properties of all inventive steels and comparative steels were determined:
YS: Yield strength
UTS: ultimate tensile strength
Tel: total elongation
HER: hole expansion ratio The following mechanical properties of all inventive steels and comparative steels were determined:
YS: Yield strength
UTS: ultimate tensile strength
Tel: total elongation
HER: hole expansion ratio The examples show that the steel sheets according to the invention are the only one to show all the targeted properties thanks to their specific composition and microstructures.

What is claimed is:

1. A tempered and coated steel sheet having a composition comprising the following elements, expressed in percentage by weight:
   0.17%≤carbon≤0.25%,
   1.8%≤manganese≤2.3%,
   0.5%≤silicon≤2.0%,
   0.03≤aluminum≤1.2%,
   sulphur≤0.03%,
   phosphorus≤0.03%,
   the remainder of the composition composed of iron and unavoidable impurities caused by processing,
   the microstructure of said steel sheet comprising in area fraction, 4 to 20% residual austenite, 0 to 15% of ferrite, 40 to 85% tempered bainite and a minimum of 5% of tempered martensite, wherein the cumulated amounts of tempered martensite and residual austenite is between 10 and 30%, and
   a yield strength above 700 MPa, an ultimate tensile strength above 950 MPa, a hole elongation ratio above 18%, a total elongation above 12%,
   and wherein the tempered martensite is composed of laths elongated in one direction inside each grain issued from a primary austenite grain, in which iron carbide sticks which are 50 to 200 nm long are precipitated between the laths.

2. A tempered and coated steel sheet according to claim 1, wherein the composition includes 0.6% to 1.8% of silicon.

3. A tempered and coated steel sheet according to claim 1, wherein the composition includes 0.03% to 0.6% of aluminium.

4. A tempered and coated steel sheet according to claim 1, wherein the cumulated amounts of tempered martensite and residual austenite is between 10% and 25%.

5. A tempered and coated steel sheet according to claim 1, wherein, the cumulated amounts of tempered martensite and residual austenite is more than or equal to 15% and the percentage of tempered martensite is higher than 10%.

6. A tempered and coated steel sheet according to claim 1, wherein the carbon content of residual austenite is between 0.9 to 1.1%.

7. A tempered and coated steel sheet according to claim 1, wherein said tempered and coated steel sheet has an ultimate tensile strength of 1000 MPa to 1100 MPa and a hole expansion ratio above 20%.

8. A structural or safety part of a vehicle comprising a steel sheet according to claim 1.

9. A vehicle comprising a structural or safety part according to claim 8.

10. A tempered and coated steel sheet according to claim 1, wherein the composition further comprises one or more of the following elements:
   chromium≤0.4%,
   molybdenum≤0.3%,
   niobium≤0.04%,
   titanium≤0.1%.

11. A tempered and coated steel sheet according to claim 1, wherein the tempered steel sheet is coated with a zinc or zinc alloy coating.

12. A tempered and coated steel sheet according to claim 1, wherein
   0.750%≤silicon≤2.0%, and
   0.750%≤aluminum≤1.2%.

13. A tempered and coated steel sheet according to claim 1, wherein the ferrite comprises ferrite formed during a cooling after annealing of the steel sheet.

14. A tempered and coated steel sheet according to claim 1, wherein the microstructure consists of the ferrite, the tempered bainite, the tempered martensite and the residual austenite.

15. A method of production of the tempered and coated steel sheet according to claim 1, the method comprising the following successive steps:
   providing a semi-finished product having the composition;
   reheating said semi-finished product to a temperature above Ac3;
   hot rolling the semi-finished product in an austenitic range, wherein the hot rolling finishing temperature is between 750° C. and 1050° C. to obtain a hot rolled steel sheet;
   cooling the hot rolled steel sheet at a cooling rate 20 to 150° C./s to a coiling temperature of less than or equal to 600° C.; and coiling the hot rolled steel sheet;
   cooling the hot rolled steel sheet to room temperature;
   annealing the hot rolled steel sheet at temperature between 400° C. and 750 to obtain an annealed hot rolled steel sheet;
   cold rolling the annealed hot rolled steel sheet with a reduction rate between 30 and 80% to obtain a cold rolled steel sheet;
   then heating the cold rolled steel sheet at a rate between 1 to 20° C./s to a soaking temperature above Ae3 where it is held during less than 600 seconds;
   then cooling the cold rolled steel sheet at a rate greater than 5° C./s to a temperature above Ms and less than 475° C. and holding the cold rolled steel sheet at such temperature during 20 to 400 seconds;
   then cooling the cold rolled steel sheet at cooling rate not greater than 200° C./s down to room temperature;
   then reheating the annealed steel sheet at a rate between 1° C./s to 20° C./s to a soaking temperature between 440° C. and 600° C. where it is held during less than 100s and then hot dipping the annealed steel sheet in a bath zinc or zinc alloy coating for tempering and coating it, cooling the tempered and coated steel sheet to room temperature at a cooling rate between 1° C./s and 20° C./s.

16. A method according to claim 15, wherein the composition further comprises one or more of the following elements:

chromium≤0.4%,
molybdenum≤0.3%,
niobium≤0.04%,
titanium≤0.1%.

17. A method according to claim 15, wherein the coiling temperature is above 400° C.

18. A method according to claim 15, further comprising performing scale removal process on the hot rolled steel sheet.

19. A method according to claim 15, further comprising performing scale removal process on the annealed hot rolled steel sheet.

* * * * *